US011207626B2

(12) United States Patent
Vo et al.

(10) Patent No.: US 11,207,626 B2
(45) Date of Patent: Dec. 28, 2021

(54) LIQUID RESTRICTION APPARATUS FOR USE IN A VAPORIZER

(71) Applicant: Vertigo Vapor LLC, Redmond, WA (US)

(72) Inventors: Ted Thanh Vo, Redmond, WA (US); Thomas Timothy Vo, Redmond, WA (US)

(73) Assignee: Vertigo Vapor LLC, Redmond, WA (US)

( * ) Notice: Subject to any disclaimer, the term of this patent is extended or adjusted under 35 U.S.C. 154(b) by 761 days.

(21) Appl. No.: 16/038,042

(22) Filed: Jul. 17, 2018

(65) Prior Publication Data

US 2019/0021396 A1    Jan. 24, 2019

Related U.S. Application Data

(60) Provisional application No. 62/534,527, filed on Jul. 19, 2017.

(51) Int. Cl.
| | |
|---|---|
| *B01D 45/08* | (2006.01) |
| *B01D 53/22* | (2006.01) |
| *B01D 53/00* | (2006.01) |
| *A24F 7/04* | (2006.01) |
| *B01D 53/02* | (2006.01) |
| *A24F 40/485* | (2020.01) |
| *A24F 40/10* | (2020.01) |

(52) U.S. Cl.
CPC .............. *B01D 45/08* (2013.01); *A24F 7/04* (2013.01); *A24F 40/485* (2020.01); *B01D 53/002* (2013.01); *B01D 53/02* (2013.01); *B01D 53/229* (2013.01); *A24F 40/10* (2020.01); *B01D 2253/202* (2013.01)

(58) Field of Classification Search
None
See application file for complete search history.

(56) References Cited

U.S. PATENT DOCUMENTS

| | | | | |
|---|---|---|---|---|
| 3,895,926 A | * | 7/1975 | Lerner | B01D 47/06 95/219 |
| 3,932,151 A | * | 1/1976 | Lau | B05B 14/465 96/325 |
| 4,608,064 A | * | 8/1986 | Napadow | B01D 50/004 96/307 |
| (Continued) |
| 5,391,220 A | * | 2/1995 | Patterson | B01D 45/08 55/462 |

FOREIGN PATENT DOCUMENTS

WO    WO-2016034157 A1 *   3/2016    ........... A24F 40/485

OTHER PUBLICATIONS

Translation of WO2016034157A1, accessed Jul. 27, 2021 (Year: 2016).*

*Primary Examiner* — Christopher P Jones
*Assistant Examiner* — Phillip Y Shao
(74) *Attorney, Agent, or Firm* — Rowan TELS LLC (57) ABSTRACT

An apparatus for catching un-vaporized e-liquid prevents un-vaporized e-liquid from exiting the mouthpiece of an atomizer or vaporizer. A liquid catch chamber is positioned after the outlet from a vaporizer's heating element, with a liquid deflection barrier between the outlet from the vaporizer's heating element and the outlet from the catch chamber. Protrusions around the outlet apertures may further restrict the flow of un-vaporized e-liquid out of the outlets. Further, absorbent materials may also be used to retain the e-liquid within the catch chamber.

19 Claims, 9 Drawing Sheets

(56) References Cited

U.S. PATENT DOCUMENTS

| | | | | |
|---|---|---|---|---|
| 6,123,323 A * | 9/2000 | Yoneda | B01J 19/0073 | 261/96 |
| 6,290,742 B1 * | 9/2001 | Pakkala | B01D 45/08 | 55/443 |
| 7,041,159 B2 * | 5/2006 | Entezarian | B01D 50/002 | 55/320 |
| 7,198,659 B1 * | 4/2007 | Fanguy | B01D 19/0042 | 55/342 |
| 8,042,529 B2 * | 10/2011 | Meinig | F01M 13/04 | 123/572 |
| 8,083,901 B2 * | 12/2011 | Sharma | B01D 3/20 | 202/158 |
| 8,152,884 B1 * | 4/2012 | Severance | B01D 46/0087 | 55/462 |
| 8,298,309 B2 * | 10/2012 | Nerb | B01D 46/06 | 55/462 |
| 9,211,547 B2 * | 12/2015 | Latta | B07B 7/02 | |
| 2002/0134244 A1 * | 9/2002 | Gu | B01D 8/00 | 95/267 |
| 2003/0075046 A1 * | 4/2003 | Lenzing | B01D 45/06 | 95/267 |
| 2009/0282985 A1 * | 11/2009 | Whiteley | B01D 19/0031 | 96/189 |
| 2012/0186594 A1 * | 7/2012 | Liu | G01P 13/0033 | 131/329 |
| 2013/0081642 A1 * | 4/2013 | Safari | A24F 40/485 | 131/329 |
| 2014/0157737 A1 * | 6/2014 | Schleiden | F01M 13/04 | 55/464 |
| 2015/0128543 A1 * | 5/2015 | Piszczek | B01D 50/002 | 55/440 |
| 2015/0241059 A1 * | 8/2015 | Oishi | B01D 53/1425 | 423/220 |
| 2016/0175749 A1 * | 6/2016 | Suda | B01D 45/12 | 95/269 |
| 2017/0189629 A1 * | 7/2017 | Newberry | A61M 15/0021 | |
| 2017/0258143 A1 * | 9/2017 | Lederer | H05B 1/0297 | |
| 2017/0354182 A1 * | 12/2017 | Liu | A24F 40/40 | |
| 2018/0160727 A1 * | 6/2018 | Bauer | A24F 1/16 | |
| 2019/0166905 A1 * | 6/2019 | Liu | A24F 40/05 | |

* cited by examiner

LIQUID RESTRICTION APPARATUS FOR USE IN A VAPORIZER

CROSS-REFERENCE TO RELATED APPLICATIONS

This application claims benefit under 35 U.S.C. 119 to U.S. application Ser. No. 62/534,527, entitled "LIQUID RESTRICTION APPARATUS FOR USE IN A VAPORIZER", filed on Jul. 19, 2017, and incorporated herein by reference in its entirety.

BACKGROUND

E-cigarette vaporizers and atomizers may encounter problems where liquid may spatter into the user's mouth, delivering the e-liquid to the user in the incorrect quantity and state, this is unpleasant for the user, and also wastes e-liquid. Further, vaporized e-liquid may condense on the inside of the mouthpiece, and spatter which impacts the inside of the mouthpiece can collect in the mouthpiece and then leak out of the mouthpiece. This may occur in the user's mouth when the user is attempting to use the e-cigarette and also while the vaporizer or atomizer is being stored.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Referring to FIG. 1-FIG. 4, an un-vaporized e-liquid restriction apparatus 100 comprises walls 102, a one or more vapor outlets 104, an attachment slot 106, a first wall 202, and a second wall 204.

The walls define the outer surface and the inner surface of the un-vaporized e-liquid restriction apparatus 100. The walls 102 may comprise the one or more vapor outlets 104 and one or more vapor inlets (not depicted in FIG. 1-FIG. 4). The one or more vapor outlets 104 and the one or more vapor inlets may define a vapor flow for the un-vaporized e-liquid restriction apparatus 100. The vapor flow may be from the one or more vapor inlets to the one or more vapor outlets 104. The one or more vapor inlets may be located on the first wall 202 of the walls 102, and the one or more vapor outlets 104 may be located on the second wall 204 of the walls 102.

Figure 1:
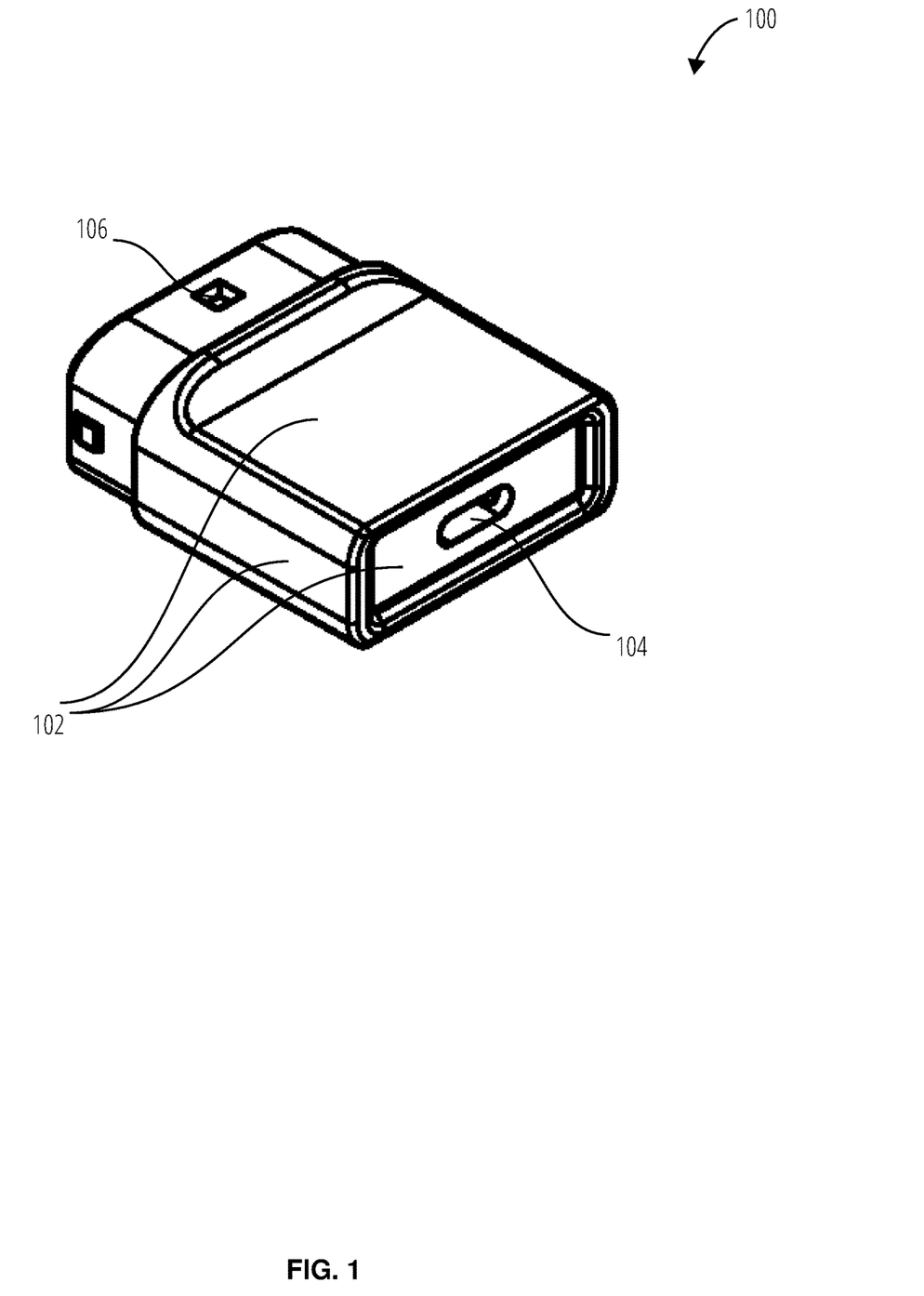
FIG. 1 illustrates an isometric view of an embodiment of an un-vaporized e-liquid restriction apparatus 100.
Figure 2:
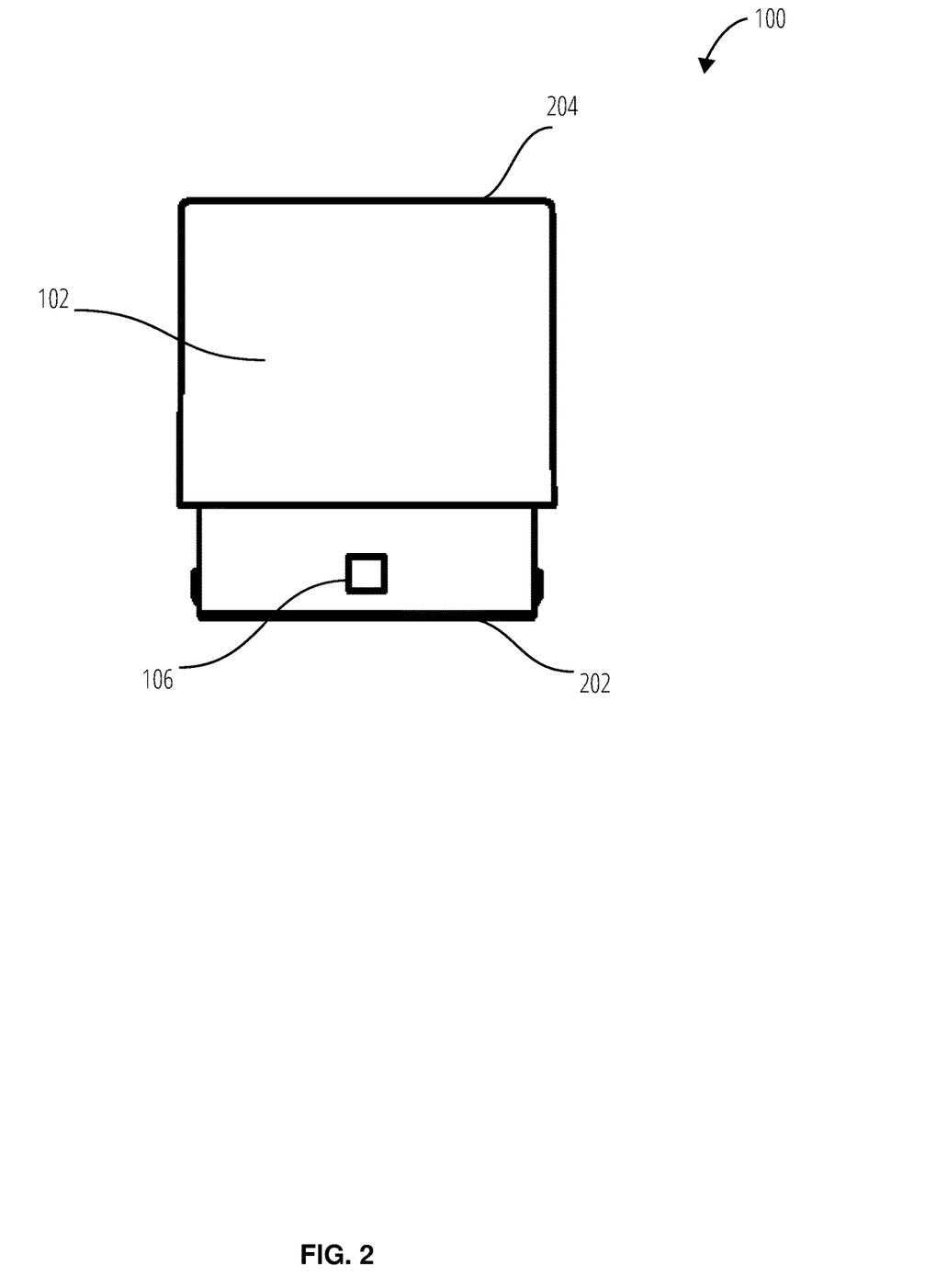
FIG. 2 illustrates a front view of an embodiment of an un-vaporized e-liquid restriction apparatus 100.
Figure 3:
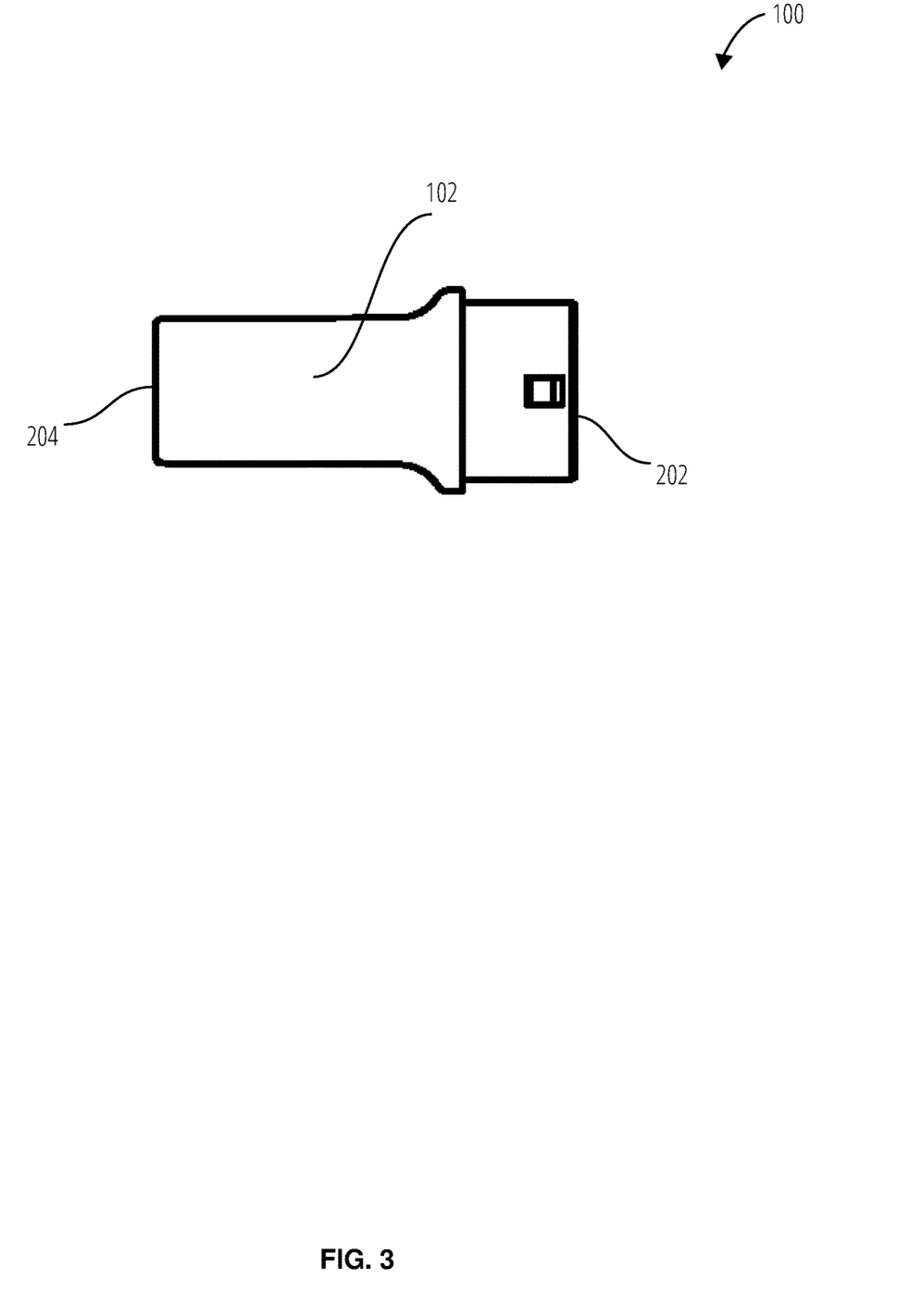
FIG. 3 illustrates a side view of an embodiment of an un-vaporized e-liquid restriction apparatus 100.
Figure 4:
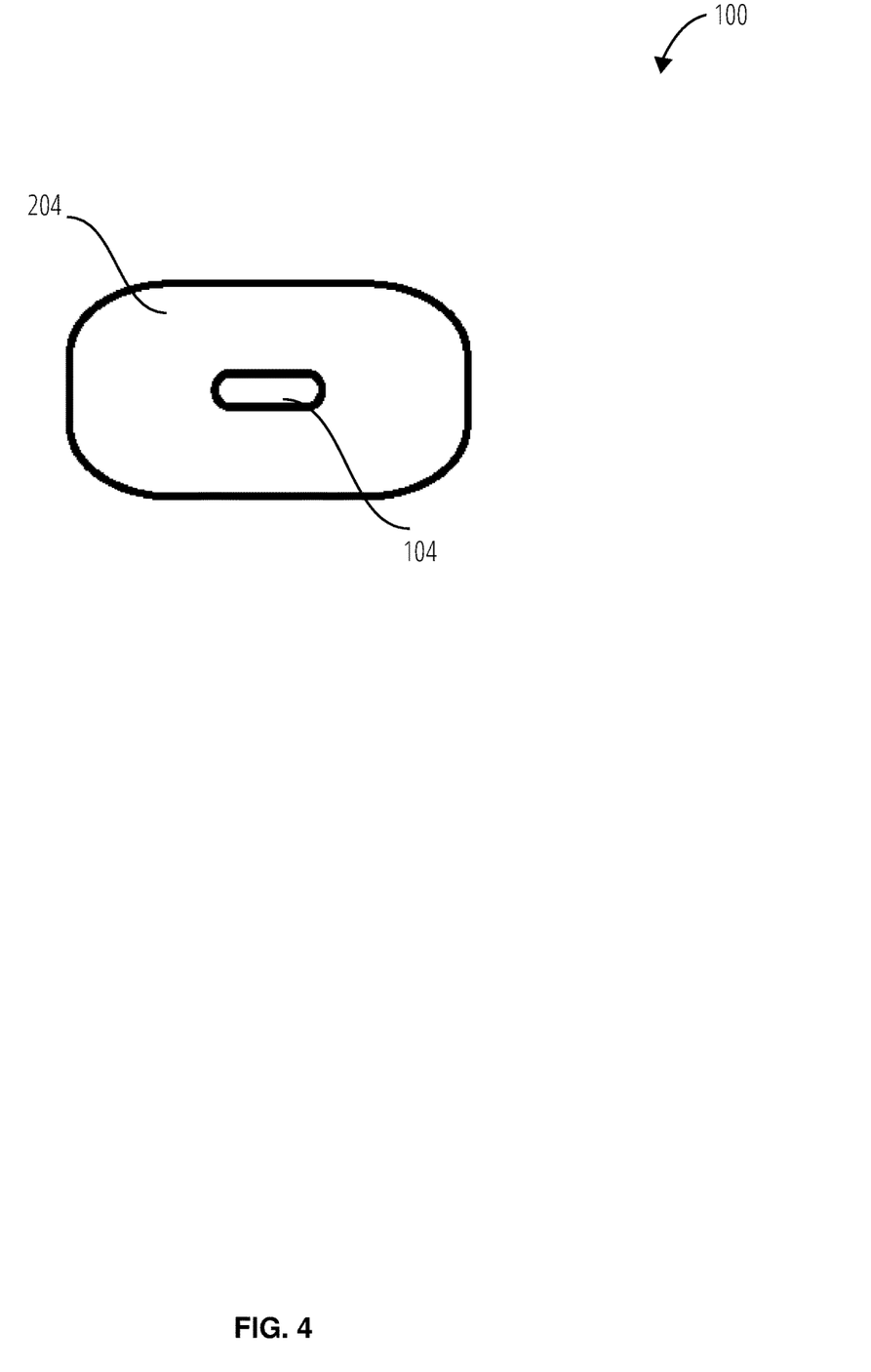
FIG. 4 illustrates a top view of an embodiment of an un-vaporized e-liquid restriction apparatus 100.
Figure 5:
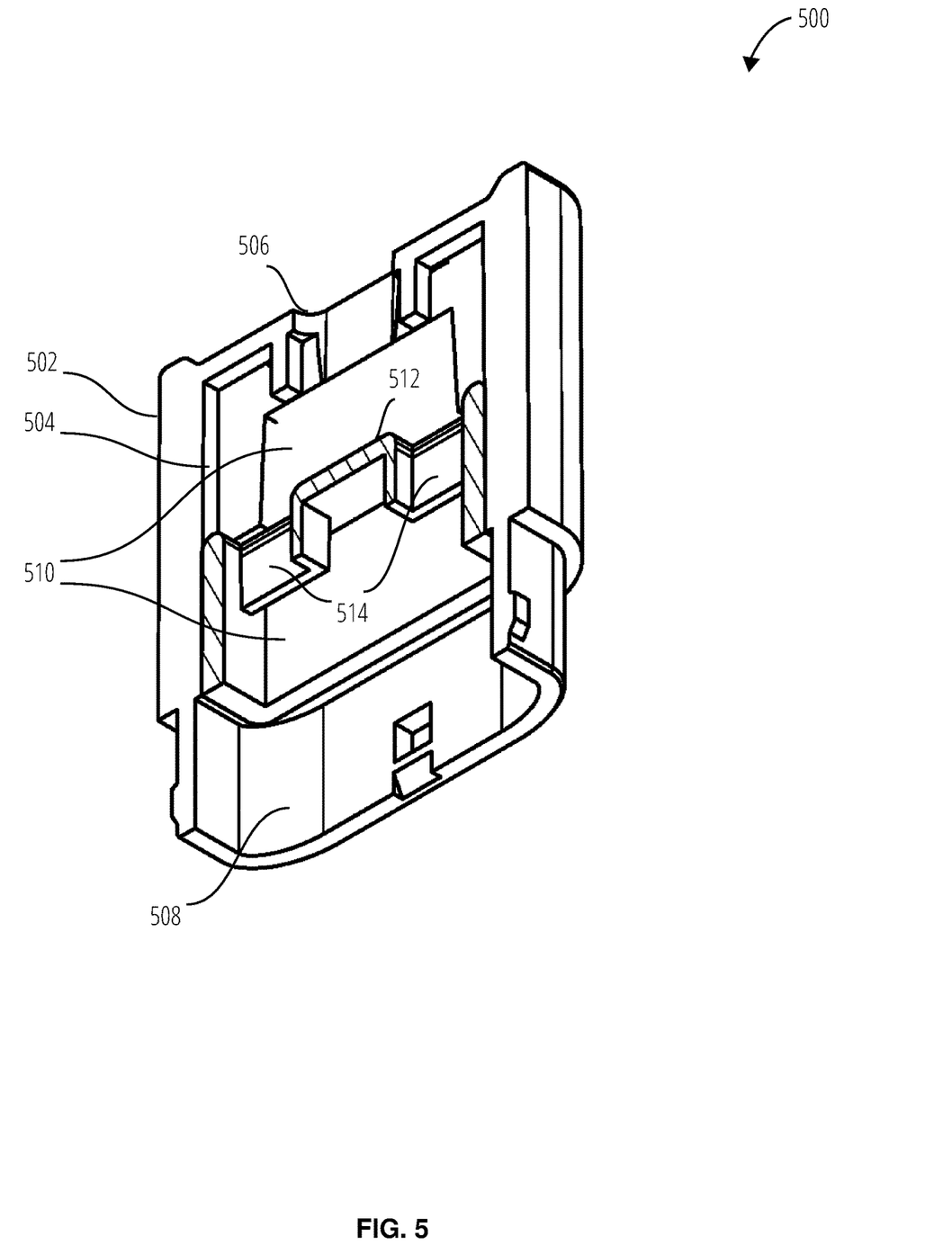
FIG. 5 illustrates an isometric cross-section view of an embodiment of an un-vaporized e-liquid restriction apparatus 500.

Referring to FIG. 5, an un-vaporized e-liquid restriction apparatus 500 comprises an outer surface 502, an inner surface 504, a one or more vapor outlets 506, a one or more vapor inlets 508, a liquid catch chamber 510, a liquid deflection barrier 512, and vapor channels 514.

The un-vaporized e-liquid restriction apparatus 500 comprise one or more walls, the walls having the outer surface 502 and the inner surface 504. The walls may comprise the one or more vapor outlets 506 and the one or more vapor inlets 508. The inner surface 504 may be tapered from the one or more vapor inlets 508 to the one or more vapor outlets 506. The inner surface 504 may define all or a portion of the liquid catch chamber 510.

The one or more vapor outlets 506 and the one or more vapor inlets 508 may be apertures, each of the one or more vapor outlets 506 and the one or more vapor inlets 508 being through one of the walls. The aperture may be tapered. The cross-section of one or more vapor outlets 506 and the one or more vapor inlets 508 may be a variety of shapes in each of the embodiments. The cross-section may be circular, elliptical, oval, egg-shaped, square, rectangular, polygonal, etc. The one or more vapor outlets 506 may have one or more protrusions extending from the aperture. The protrusion may encompass all or a portion of the aperture. The protrusions may be oriented opposite the direction of vapor flow. The protrusions and aperture may further be tapered either in the direction of vapor flow or against the direction of vapor flow.

The liquid deflection barrier 512 is disposed within the liquid catch chamber 510 defined by the inner surface 504. The liquid deflection barrier 512 may alter a portion of the liquid catch chamber 510, reducing the volume of the liquid catch chamber 510 where the liquid deflection barrier 512 is disposed. The liquid deflection barrier 512 may be friction fit within the liquid catch chamber 510. The liquid deflection barrier 512 may also be an extension of the inner surface 504 of the walls. The liquid deflection barrier 512 comprises the vapor channels 514. The vapor channels 514 may be an aperture in the liquid deflection barrier 512. The cross-section of the vapor channels 514 may be circular, elliptical, oval, egg-shaped, square, rectangular, polygonal, etc. The vapor channels 514 may have one or more protrusions extending from the aperture. The protrusion may encompass all or a portion of the aperture. The protrusions may be oriented opposite the direction of vapor flow. The protrusions and aperture may further be tapered either in the direction of vapor flow or against the direction of vapor flow. The vapor channels 514 may be offset from the one or more vapor outlets 506. Each of the vapor channels 514 may include baffles or condensers along the surface of the vapor channels 514. Vapor flows through the one or more vapor inlets 508 and liquid is deflected by the liquid deflection barrier 512 while vapor is allowed to pass through the vapor channels 514 and out through the one or more vapor outlets 506.

In some embodiments, the liquid deflection barrier 512 may further include a vapor-permeable membrane. The liquid deflection barrier may further comprise spaces between the group of baffles. The liquid catch chamber is disposed adjacent to a heating element and vaporized e-liquid and un-vaporized e-liquid is drawn up a heating element vapor outlet connected to the group of vapor inlets. An absorbent material may be employed within the liquid catch chamber to absorb un-vaporized e-liquid.

Figure 6:
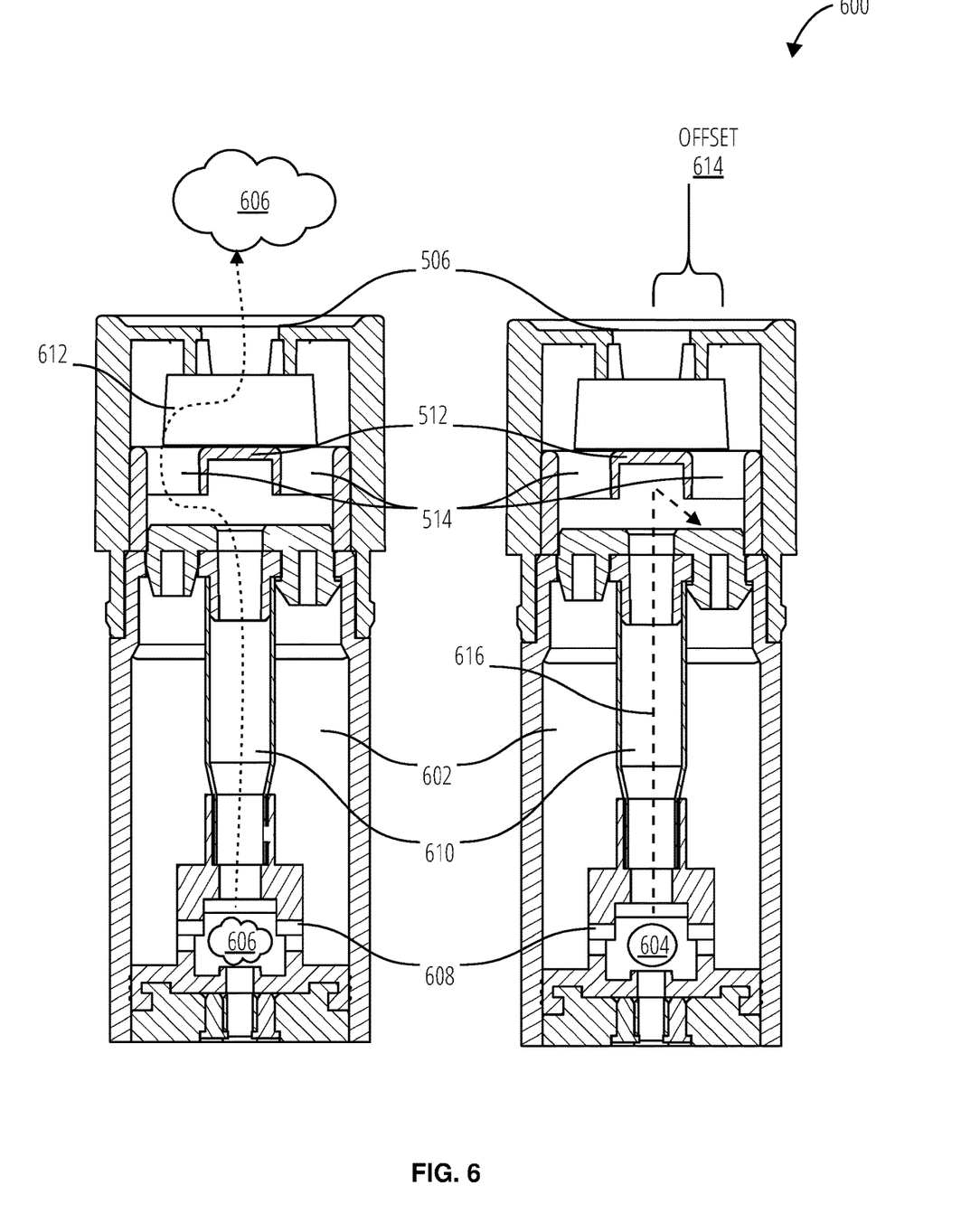
FIG. 6 illustrates a front cross-section view of an embodiment of an un-vaporized e-liquid restriction apparatus 600.

Referring to FIG. 6, an un-vaporized e-liquid restriction apparatus 600 comprises one or more vapor outlets 506, a liquid deflection barrier 512, vapor channels 514, a reservoir 602, un-vaporized e-liquid 604, vaporized e-liquid 606, a heating element 608, a coil vapor outlet 610, a vapor path 612, an offset 614, and a liquid path 616.

The reservoir 602 may store the un-vaporized e-liquid 604, which may be sent to the heating element 608 to be vaporized into the vaporized e-liquid 606. The heating element 608 vaporizes the un-vaporized e-liquid 604 into the vaporized e-liquid 606, and the vaporized e-liquid 606 is drawn up the coil vapor outlet 610. The vaporized e-liquid 606 then travels along the vapor path 612, and out of the one or more vapor outlets 506. The vaporized e-liquid 606 may pass through the vapor channels 514, which are offset 614 from the one or more vapor outlets 506. The resulting vapor path 612 is thus made tortuous. The un-vaporized e-liquid 604 may also be inadvertently drawn up the coil vapor outlet 610. The un-vaporized e-liquid 604 may condense prior to exiting the one or more vapor outlets 506 or is blocked by the liquid deflection barrier 512. The offset 614 between the vapor channels 514 in the liquid deflection barrier 512 and the one or more vapor outlets 506 assists in the deflection of un-vaporized e-liquid 604. The offset 614 may be from the centerline of the one or more vapor outlets 506 to the centerlines of the vapor channels 514. In some embodiments, a portion of the aperture of the one or more vapor outlets 506 overlaps the aperture of the vapor channels 514. In other embodiments, the apertures do not overlap. The offset 614 is configured to prevent the un-vaporized e-liquid 604 from having a direct path from the coil vapor outlet 610 out through the one or more vapor outlets 506.

Figure 7:
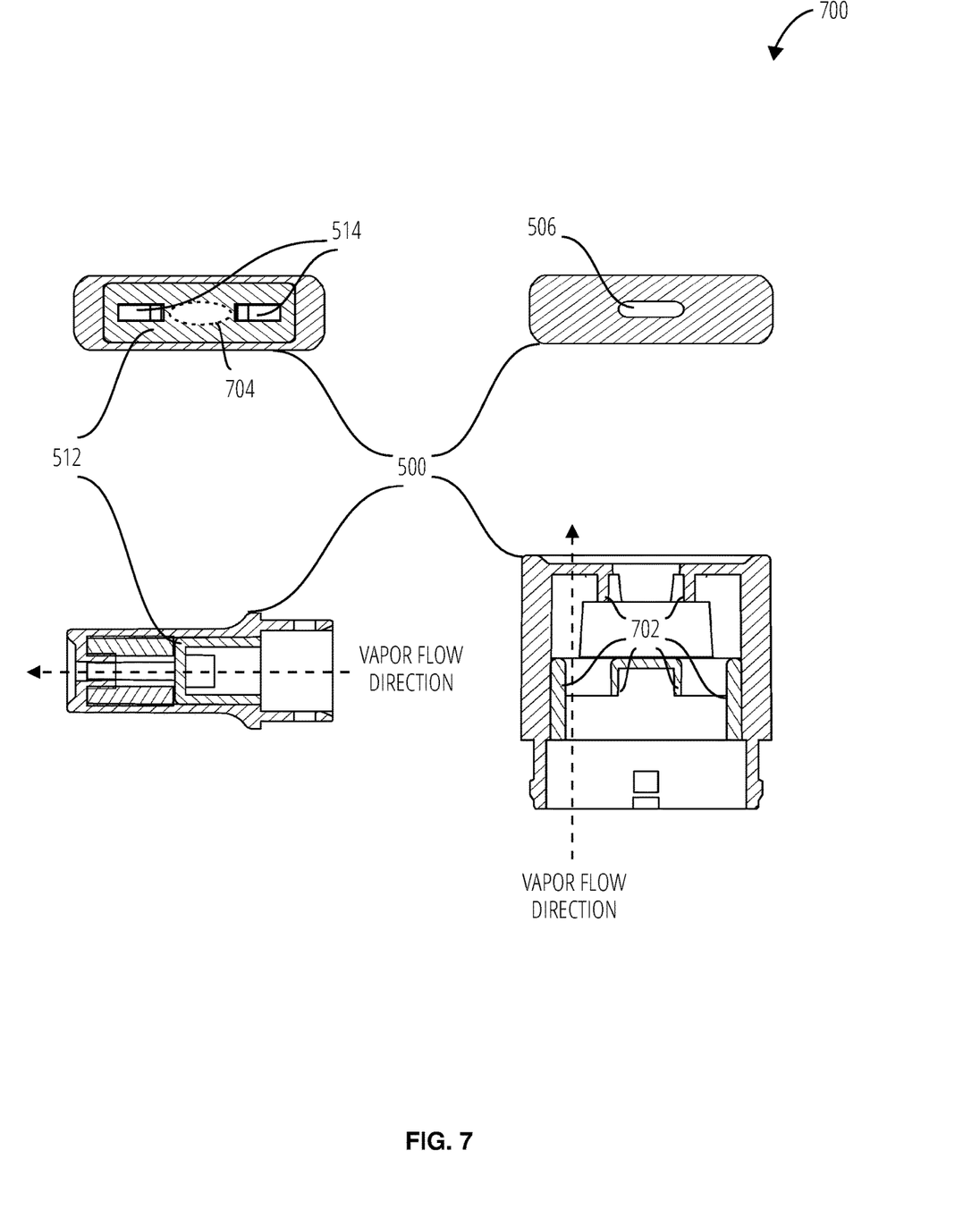
FIG. 7 illustrates top cross-section views, side cross-section views, and front cross-section views of an embodiment of an un-vaporized e-liquid restriction apparatus 700.

Referring to FIG. 7, the un-vaporized e-liquid restriction apparatus 700 depicts (clock-wise from upper left) a top view cross-section of the liquid deflection barrier 512, a top view cross-section of a wall with the one or more vapor outlets 506, a front view cross-section of the un-vaporized e-liquid restriction apparatus 500, and a side view cross-section of the un-vaporized e-liquid restriction apparatus 500. The circumferential protrusions 702 of the un-vaporized e-liquid restriction apparatus 500 are depicted on the front view cross-section. A vapor flow direction may be defined by the one or more vapor outlets 506 and the one or more vapor inlets 508, or by the walls comprising the one or more vapor outlets 506 and the one or more vapor inlets 508. The circumferential protrusions 702 may be oriented opposite to the vapor flow direction, extending from the one or more vapor outlets 506 and the liquid deflection barrier 512. The projected cross-section 704 depicts a cross-section of the one or more vapor outlets 506 onto the liquid deflection barrier 512. The one or more vapor outlets 506 and the vapor channels 514 may be configured such that the projected cross-section 704 does not overlap or partially overlaps the cross-section of the vapor channels 514 (no overlap as depicted).

Figure 8:
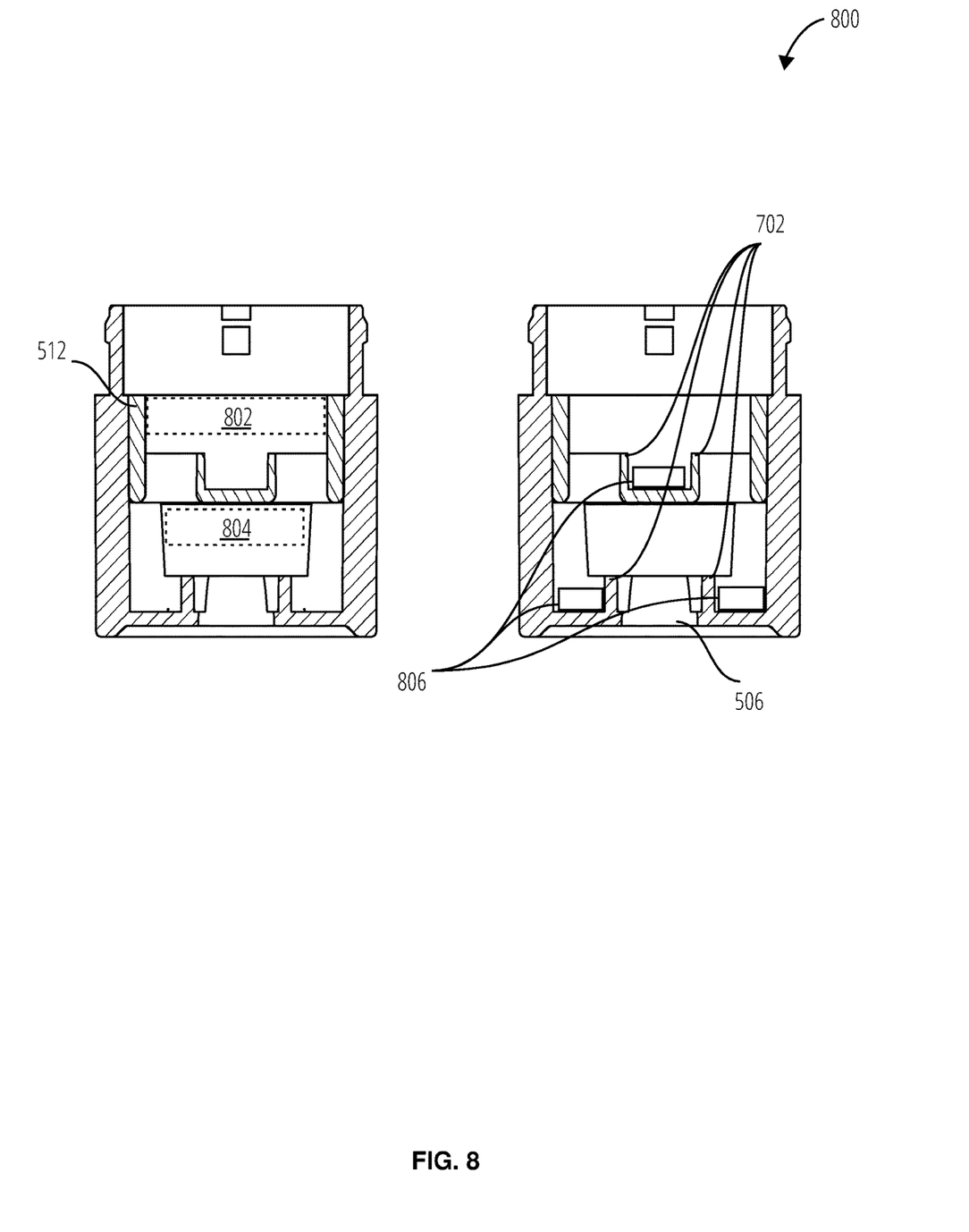
FIG. 8 illustrates a front cross-section view of an embodiment of an un-vaporized e-liquid restriction apparatus 800.

Referring to FIG. 8, the un-vaporized e-liquid restriction apparatus 800 comprises one or more vapor outlets 506, circumferential protrusions 702, an absorbent material 802, an absorbent material 804, and an un-vaporized e-liquid 806.

The circumferential protrusions 702 collects the un-vaporized e-liquid 806, inhibiting the un-vaporized e-liquid 806 from escaping out of the one or more vapor outlets 506. The absorbent material 802 and absorbent material 804 may also be added to help collect the un-vaporized e-liquid 806. The absorbent material 802 may be coupled or otherwise attached to all or a portion of the inner surface of the liquid deflection barrier 512. The absorbent material 804 may be coupled or otherwise attached to all or a portion of the inner surface 504 of the walls. A variety of synthetic and natural materials and combinations thereof may be employed to absorb the un-vaporized e-liquid 806. For example, sodium polyacrylate and other polymer compounds, cotton fiber, etc., may be utilized.

Figure 9:
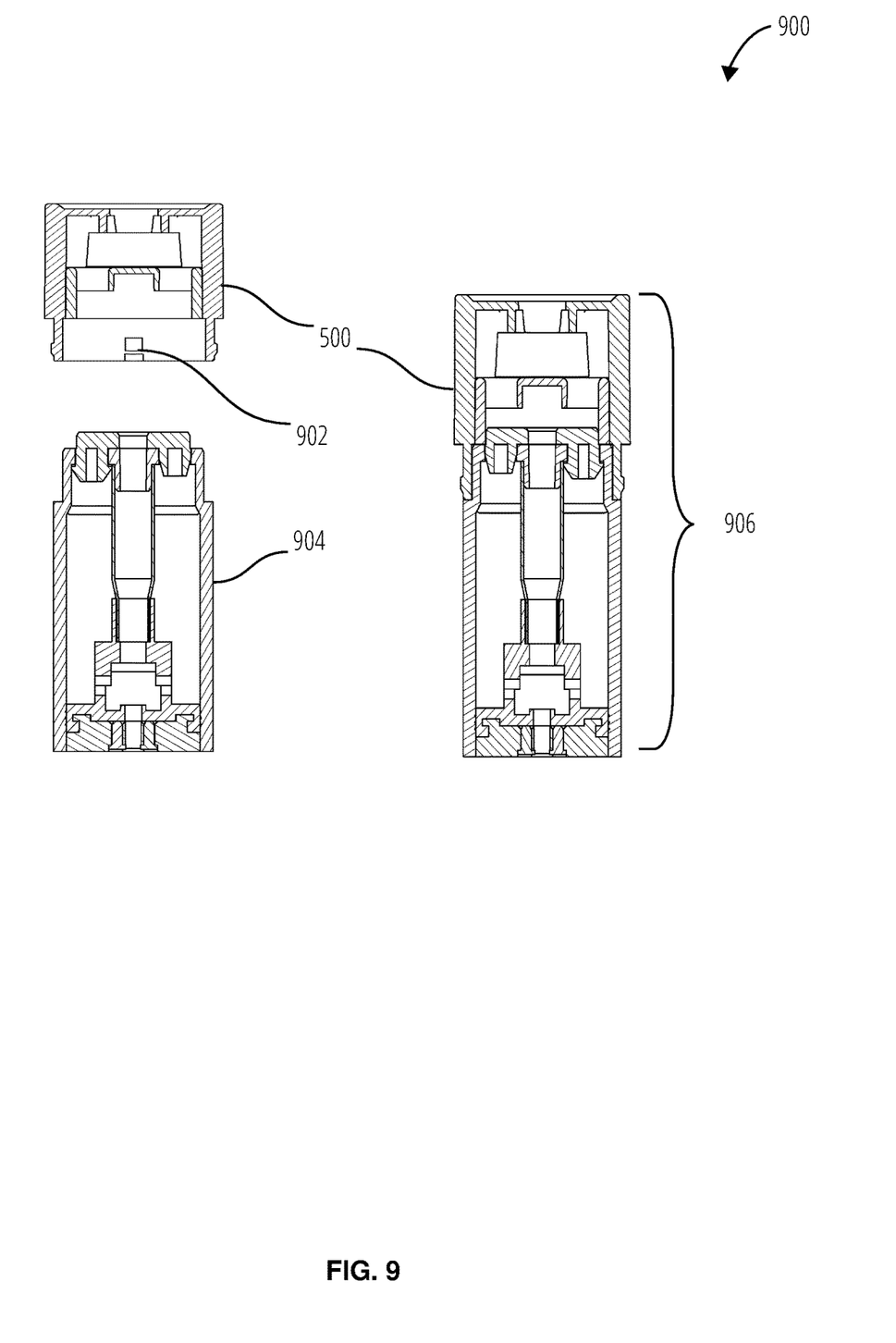
FIG. 9 illustrates a front cross-section view of an embodiment of an un-vaporized e-liquid restriction apparatus 900.

Referring to FIG. 9, the un-vaporized e-liquid restriction apparatus 900 comprises an un-vaporized e-liquid restriction apparatus 500, an e-liquid cartridge 904, and a single piece e-liquid cartridge 906.

The un-vaporized e-liquid restriction apparatus 500 may be configured to add onto an existing e-liquid cartridge 904 or may be configured as part of a single piece e-liquid cartridge 906. The un-vaporized e-liquid restriction apparatus 500 may comprise an attachment mechanism 902 to enable the un-vaporized e-liquid restriction apparatus 500 to attach to the e-liquid cartridge 904. The attachment mechanism 902 may be a slot or groove to receive a portion of the e-liquid cartridge 904. The un-vaporized e-liquid restriction apparatus 500 may further be configured to return un-vaporized e-liquid to the e-liquid cartridge 904. The un-vaporized e-liquid may be returned to the reservoir or the coil vapor outlet. For example, the circumferential protrusions on the liquid deflection barrier may be oriented at an angle relative to the vapor flow direction to direct the condensed e-liquid or e-liquid droplets toward either the reservoir or the coil vapor outlet.

"Plurality of condensers" herein refers to a device that is used to convert vapor into liquid, such as a surface condenser.

"Vapor-permeable membrane" herein refers to a selective barrier; the barrier may allow vapor to pass through while inhibiting the transfer of other physical substances, such as un-vaporized e-liquid.

"Plurality of baffles" herein refers to flow-directing or obstructing vanes or panels.

"Walls" herein refers to a three-dimensional structures having one or more surfaces.

"Friction fit" herein refers to a fastening between two parts which is achieved by friction after the parts are pushed together, rather than by any other means of fastening.

What is claimed is:

1. An apparatus for catching un-vaporized e-liquid comprising:
    a plurality of walls, the plurality of walls including an outer surface and an inner surface, the inner surface defining a liquid catch chamber, wherein the inner surface is tapered in a direction of vapor flow, and wherein a first wall comprises one or more vapor inlets and a second wall comprises one or more vapor outlets, the first wall and the second wall defining the direction of vapor flow, wherein the first wall is a bottom wall and the second wall is a top wall; and
    a liquid deflection barrier disposed within the liquid catch chamber between the one or more vapor inlets and the one or more vapor outlets and comprising a plurality of vapor channels offset from the one or more vapor outlets.

2. The apparatus of claim 1, wherein each of the one or more vapor outlets further comprises:
    an aperture; and
    a circumferential protrusion extending opposite the direction of vapor flow to restrict flow of the un-vaporized e-liquid out of the one or more vapor outlets.

3. The apparatus of claim 1, wherein each of the one or more vapor outlets have a rectangular cross-section.

4. The apparatus of claim 1, wherein each of the one or more vapor outlets have an oval cross-section.

5. The apparatus of claim 1, wherein each of the one or more vapor outlets are tapered in the direction of vapor flow.

6. The apparatus of claim 1, wherein each of the plurality of vapor channels further comprise:
an aperture; and
a circumferential protrusion extending opposite the direction of vapor flow to restrict flow of the un-vaporized e-liquid out of the plurality of vapor channels.

7. The apparatus of claim 1, wherein each of the plurality of vapor channels have a rectangular cross-section.

8. The apparatus of claim 1, wherein each of the plurality of vapor channels have an oval cross-section.

9. The apparatus of claim 1, wherein each of the plurality of vapor channels are tapered in the direction of vapor flow.

10. The apparatus of claim 1, wherein the liquid deflection barrier further comprises a vapor-permeable membrane.

11. The apparatus of claim 1, wherein the liquid deflection barrier further comprises a plurality of baffles and the plurality of vapor channels further comprise spaces between the plurality of baffles.

12. The apparatus of claim 1, wherein the liquid deflection barrier further comprises a plurality of condensers.

13. The apparatus of claim 1, wherein the liquid deflection barrier is friction fit within the liquid catch chamber.

14. The apparatus of claim 1, wherein the liquid catch chamber is disposed adjacent to a heating element and vaporized e-liquid and the un-vaporized e-liquid is drawn up a heating element vapor outlet connected to the one or more vapor inlets.

15. The apparatus of claim 14, wherein the liquid deflection barrier is configured to:
inhibit flow of the un-vaporized e-liquid caught by the liquid catch chamber into the heating element; and
direct the flow of the un-vaporized e-liquid caught by the liquid catch chamber into a reservoir.

16. The apparatus of claim 1, wherein an absorbent material may be employed within the liquid catch chamber to absorb the un-vaporized e-liquid.

17. The apparatus of claim 1, wherein at least one of the plurality of walls comprise a slot disposed between the one or more vapor inlets and the liquid deflection barrier, the slot configured to attach the apparatus to an e-liquid cartridge.

18. The apparatus of claim 1, wherein the plurality of vapor channels are offset from the one or more vapor outlets such that a projected cross-section of the one or more vapor outlets onto a cross-section of the plurality of vapor channels does not overlap.

19. The apparatus of claim 1, wherein the plurality of vapor channels are offset from the one or more vapor outlets such that a projected cross-section of the one or more vapor outlets onto a cross-section of the plurality of vapor channels partially overlaps.

* * * * *